Figure 1:
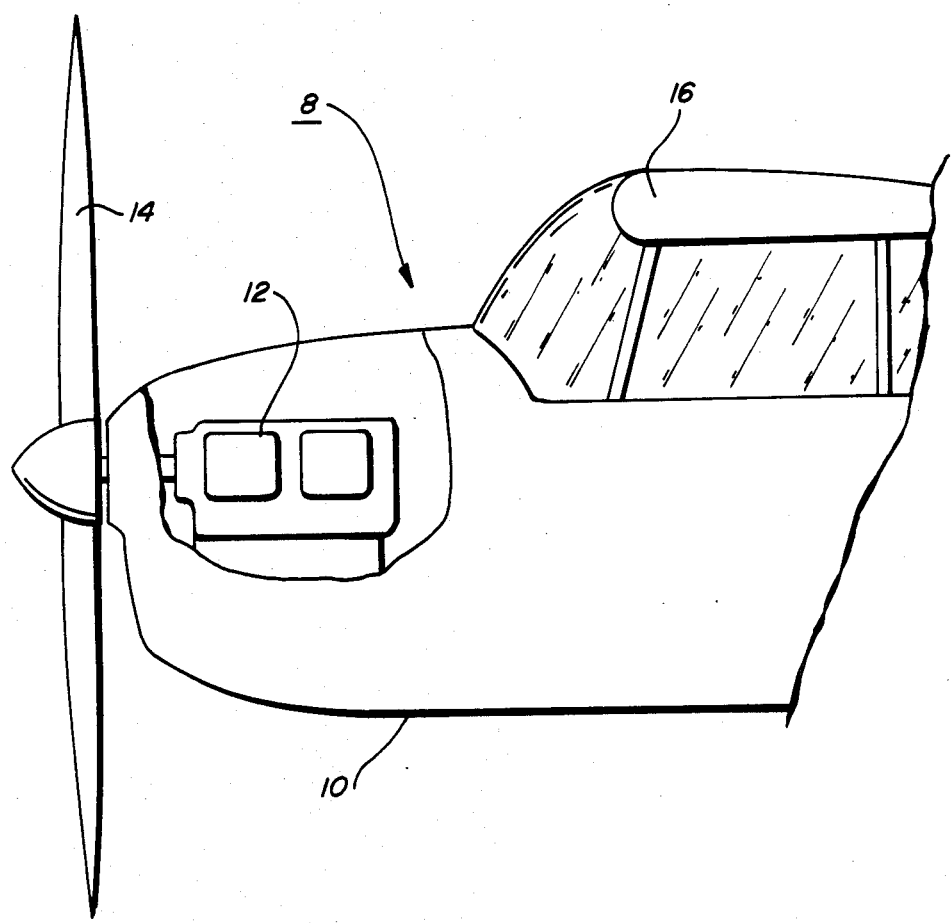

United States Patent [19]
Middlebrook

[11] Patent Number: 4,630,787
[45] Date of Patent: Dec. 23, 1986

[54] AIRFRAME AND PROPULSION SYSTEM
[76] Inventor: Daryl L. Middlebrook, 2612 Sisson Rd., Penn Yan, N.Y. 14527
[21] Appl. No.: 799,343
[22] Filed: Nov. 18, 1985
[51] Int. Cl.[4] .............................................. B64C 11/18
[52] U.S. Cl. .................................. 244/65; 244/35 R; 416/223 R; D12/214
[58] Field of Search ................... 244/39, 35 R, 65, 62; 416/223 R, 242; D12/214
[56] References Cited
U.S. PATENT DOCUMENTS
2,116,055 5/1938 Weichwald ..................... D12/214
FOREIGN PATENT DOCUMENTS
491832 2/1930 Fed. Rep. of Germany ... 416/223 R Primary Examiner—Galen Barefoot
Assistant Examiner—Mark R. Valliere
Attorney, Agent, or Firm—Bernard A. Chiama

[57] ABSTRACT

An aircraft is disclosed as having the components of a high wing airframe, a single engine of the 360 type, and a propeller formed with airfoil cross sections along the blades thereof having profiles which, when particularly matched with the designated engine and type of aircraft, result in superior performance than is available when any of the components is matched with other components. Specific disclosures of the front and rear cambers of the blades provide aerodynamic characteristics which optimize the performance capabilities of the high wing airframe in conjunction with the designated engine.

1 Claim, 3 Drawing Figures

AIRFRAME AND PROPULSION SYSTEM

BACKGROUND OF THE INVENTION

The present invention is directed to an aircraft having components of an airframe, a propeller and a power plant therefor, each having characteristics that, when combined, provide greater performance than the same components would perform in other combinations.

Generally in the assembly of an aircraft, a particular airframe is designed for specific intention such as speed utilizing low horsepower, ease of handling, cross country with low fuel consumption, high lift characteristics using short field takeoff, and many other significant requirements too numerous to mention but well known in the art. The particularly designed airframe is matched with a suitable powerplant and then made compatible with a particular propeller chosen, hopefully, to provide the desired performance for the assembled aircraft.

Generally, however, the matching of the airframe, the powerplant and the propeller systems are determined by a compilation of specifications to fit the designed specification of the airframe. In other words, the aircraft designer provides a specification for the powerplant manufacturer in terms of weight, torque, horsepower, etc. and may also specify a particular propeller which is more often an on-the-shelf product utilized with or without modifications. The assembly of the aircraft in this manner does not necessarily result in the most efficiently assembled aircraft, one that is operable to its fullest potential.

SUMMARY OF THE INVENTION

The present invention is directed to the assembly or combination of the three subassemblies or components of an aircraft, namely the airframe, the powerplant and the propeller, which provides improved operation as a combination over that for the use of the individual subassemblies or components in other aircraft use. The present invention combines three known components into an arrangement which renders compatible the integration of the components not heretofor brought together for operation.

The present invention contemplates an airframe of the high wing type for which there are various known types in use today with a powerplant capable of producing at least 180 horsepower and with a propeller having an airfoil configuration particularly adapted to the use of the powerplant component and the particular type of airframe specified. Specific disclosures of the front and rear cambers of the blades of the propeller as spaced along from the hub to the tips thereof provide aerodynamic characteristics which optimize the performance capabilities of a high wing airframe in conjunction with the designated powerplant.

It is the principal object of the present invention to combine the three main aircraft subassemblies, namely airframe, powerplant and propeller, in an arrangement that results in increased efficiency for each of the subassemblies beyond their individual expectations.

It is another object of the invention to increase aircraft performance of a high wing airframe by the utilization of a particularly rated powerplant and propeller adapted therefor.

Other objects and advantages will become apparent from the following description taken in conjunction with the drawings wherein:

THE DRAWINGS

Figure 2:
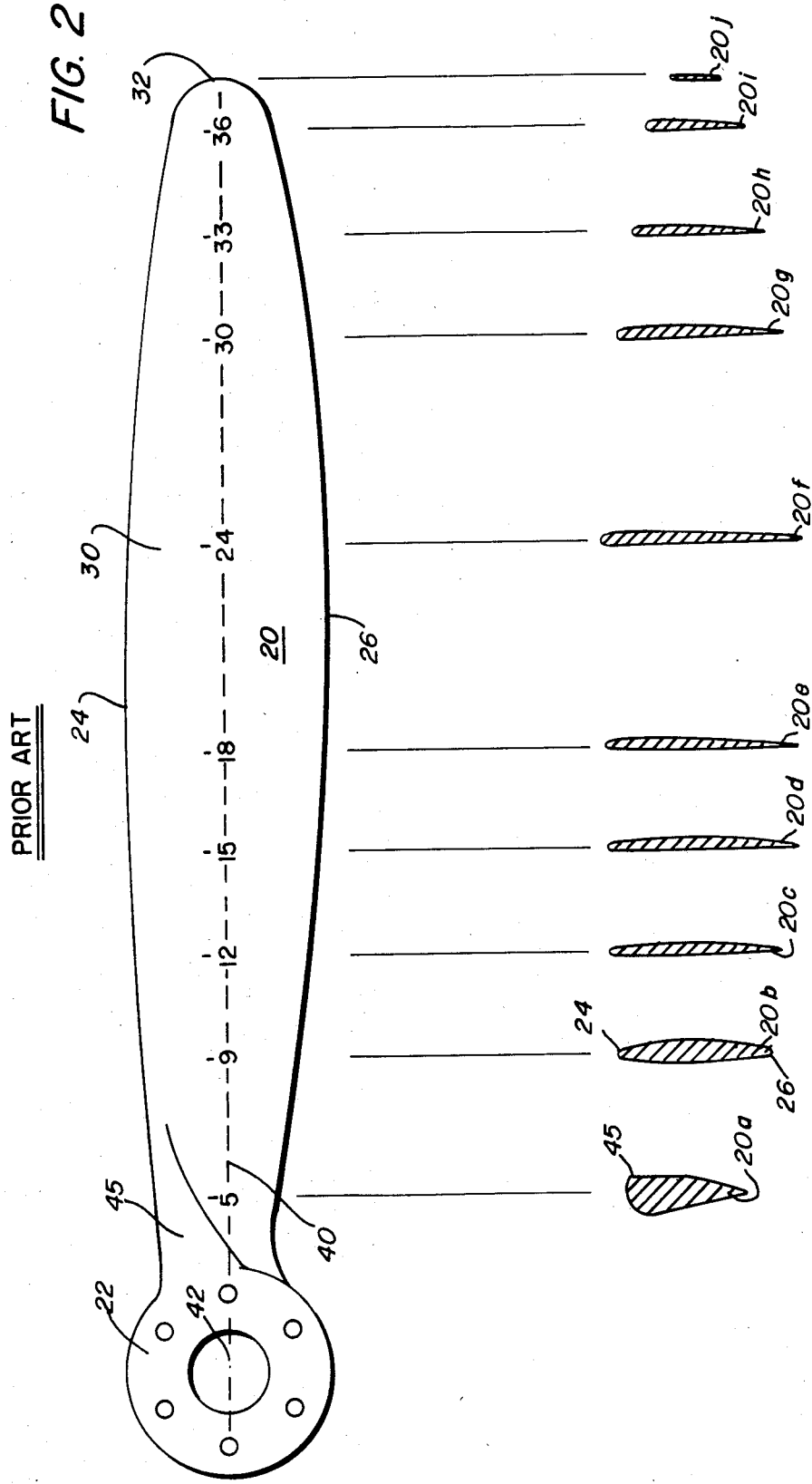
Figure 3:
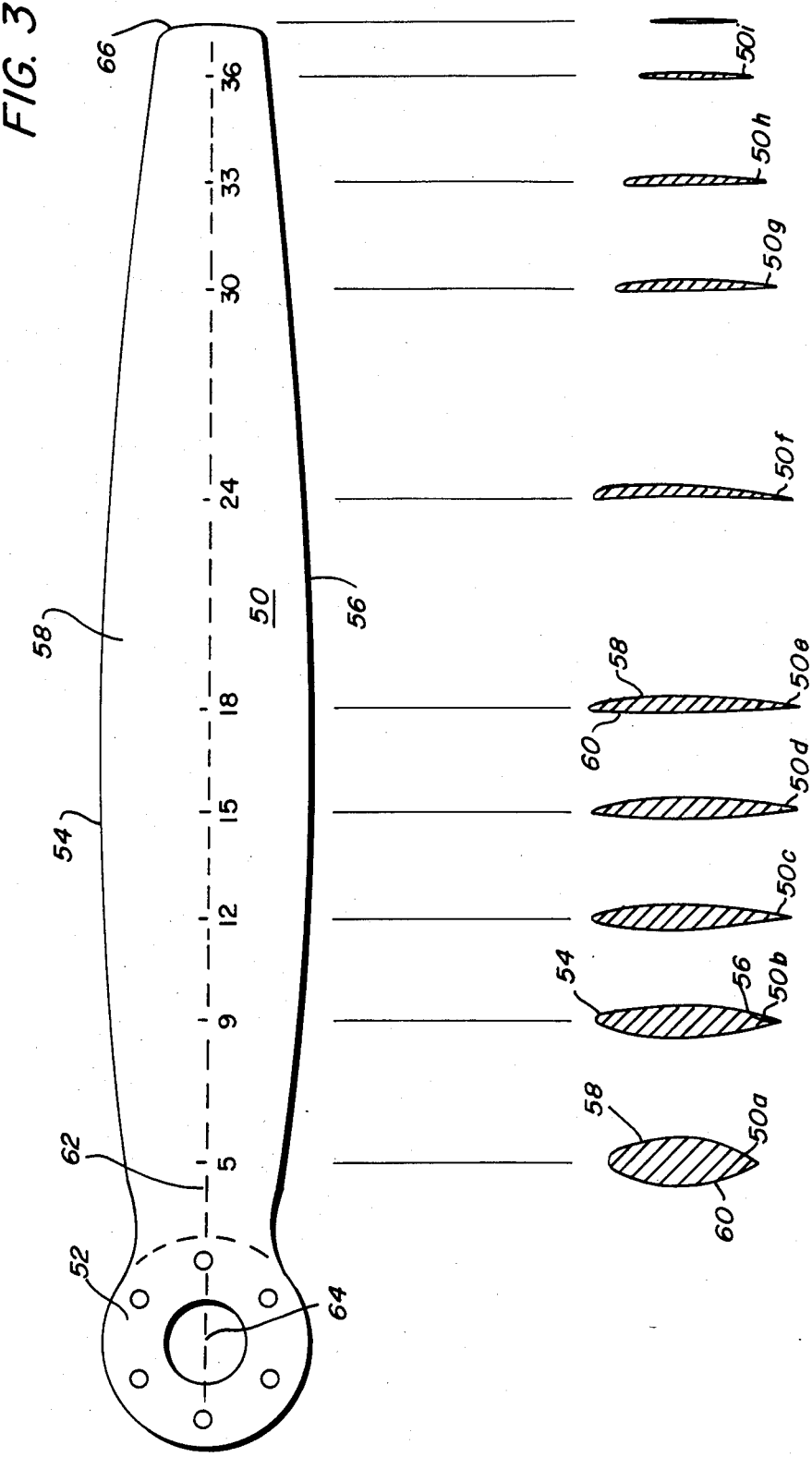

FIG. 1 is a fragmentary side elevation of an aircraft of the high wing type embodying a system of propulsion in accordance with the present invention;

FIG. 2 is a series of cross-sectional elevations of an airfoil of the prior art, and a plan view of a blade of a propeller showing exemplary locations along the blade axis of those sections; and FIG. 3 is a series of cross-sectional elevations of an airfoil utilized in the present invention, and a plan view of a blade showing the exemplary locations along the blade axis of those sections which correspond with positioning of the sections in FIG. 2.

DESCRIPTION OF THE PREFERRED INVENTION

Referring to FIG. 1 of the drawings, there is shown schematically the three main subassemblies of an aircraft 8, namely the airframe 10, a powerplant 12 and a propeller 14. The airframe 10, in fragmentary view, is of the high wing type, the high wing being illustrated by reference numeral 16. It is contemplated in the present invention that the powerplant 12 is a horizontally opposed, aircooled engine being rated at approximately 360 cubic inches and known in the art as the 360 type engine adapted to develop 180 horsepower.

In the prior art propeller of FIG. 2, a single blade 20 of a two blade, fixed-blade type propeller is illustrated in conjunction with a hub 22 adapted for connection to a driveshaft for the powerplant 12. Each of the blades 20 of the prior art propeller is formed with a leading edge 24 and a trailing edge 26. As is customary in the nomenclature of propellers, each of the blades 20 is defined by a front camber face 30 which extends from the hub 22 to the tip 32 of the blade and a similarly coextensive back or rear camber 34 which faces the airframe for the aircraft.

In discussing the airfoil of a propeller, it is conventional to refer to locations or airfoil cross sections of the blade along the length thereof in terms of stations which are numbered as indicative of the distance of the station from the center of the hub. In FIG. 2, each significant station for the blade 20 is indicated by a number along a center line 40 which defines the longitudinal axis of the associated propeller from tip to tip and through the center of the hub 22.

Each numeral therealong is indicative of the number of inches from the center 42 of the hub 22. For example, the station 5, indicated by the numeral 5, is positioned 5 inches from the hub center 42. It will also be noted that the leading and trailing edges of the blade 20 are not symmetrical about the center line 40. Similarly along the line 40, the numerals 9, 12, 15, 18, 24, 30, 33 and 36 indicate designated numbered stations which also correspond to the number of inches the particular station is located from the center 42. For example, station 18 is 18 inches from the hub center 42, and so on. It will be understood that the airfoil sections will be angularly displaced from one another along the longitudinal line 40 so as to provide sufficient twist to the blade to establish varying blade angles of attack dictated by performance requirements.

For the prior art propeller blade 20, at station 5, the airfoil cross section of the blade has the illustrated shape at 20a which may be considered the root section for the blade, it will be noted that the cross section at this station includes a flat area 45 which tapers slightly beyond this station in the direction toward the tip of the blade. At station 9, the airfoil cross section is illustrated at 20b, and to this illustration the convex camber 32, the convex rear camber 34, and the leading and trailing edges 24,26, respectively, have been added. The cambers at stations 12 and 15 flatten out somewhat with corresponding transverse shapes of 20c and 20d, respectively.

At station 18, which is approximately the midpoint of the blade 20, the rear camber for the airfoil section 20e is flat and the front camber is very slightly convex. Again at station 24, which is positioned 24 inches from the center of the hub 42, the transverse shape shown at 20f is flat. At station 30, where the transverse cross section is shown at 20g, the rear camber is slightly concave. Again at station 33, indicated by the transverse shape at 20h, the rear camber is slightly flat to slightly concave. At station 36, near the extreme tip of the blade, the rear camber is flat as indicated by the cross section 20i.

In FIG. 3, the propeller contemplated in the present invention is illustrated as being of the fixed blade type having a pair of blades 50, only one of which is shown. The blade extends from a hub 52, and is defined by a leading edge 54, a trailing edge 56, a front camber 58 and a rear camber 60. In keeping with convention utilized in the description of the propeller in FIG. 2, with respect to describing the various shapes of the airfoil cross sections of the propeller, the longitudinal center line 62 for the blade 50 has associated therewith numerical designations of stations, each of the stations having numerals indicating the number of inches that station is positioned from the center 64 of the hub 52. The airfoil cross sections of the blade 50 at each of the stations from 5 to 36 on the center line 62 is indicated by the shapes illustrated between 50a to 50i, respectively. As distinguished from the blade 20 in FIG. 2, the leading and trailing edges of the blade 50 are generally symmetrical about the longitudinal center line 62.

The front camber of the blade 50 from the hub 52 to the tip 66 of the blade is convex, but decreases from station 5 to station 36. At station 5, which is 5 inches from the hub center 64, the degree of convexity for both of the cambers is at its greatest. It will be noted that at station 5 there is no flat surface on the front camber 58 corresponding to the surface 45 as is the case at station 5 for the blade 20 associated with the propeller of FIG. 2. It will also be noted that the thickness of the blade 50 is greater than the thickness of the blade 20 at corresponding stations 5, 9, 12, 15 and 18.

It will be noted that for the blade 50, the rear camber for all stations from station 5 to station 18, which is approximately the midpoint of the blade, is convex which is not the case for the blade 20 of FIG. 2. While both blades at station 24 appear to have a similar profile for the rear camber, after station 24 of blade 50 of FIG. 3, the rear camber becomes once again slightly convex for at least the last 15% to 20% of the blade, whereas in the profile of the blade in FIG. 2, the rear camber remains concave or flat.

It has been found that a high wing, single engine aircraft utilizing the propeller having the profiles of the transverse or airfoil cross sections at the designated stations in FIG. 3 and powered by a 360 type engine performs more efficiently and is adapted to produce higher speeds with lower fuel consumption for the same power settings than the same single engine airframe and engine with the propeller having the airfoil profiles indicated in FIG. 2, or with minor variations thereof.

From the foregoing, it will be apparent that a novel combination of aircraft components has been devised which enhances the normal performance of each of the components in other environments. While the present invention has been illustrated and described in detail in connection with a specific embodiment, it is to be understood that this application is intended to cover such modification as may well be in the scope of one skilled in the art or the appended claims.

What is claimed is:

1. The combination of an aircraft comprising a high wing airframe, a power plant having a size and power specification of at least the 360 type horizontally opposed engine and a fixed blade propeller in drive relationship with said engine by means of a propeller hub, said propeller having two blades each being defined by a leading edge and a trailing edge and being formed with a front camber having a convex profile between said edges and extending continuously from said hub to the tip thereof, with the greatest degree of convexity of the said front camber immediately adjacent said hub, each of said blades being formed with a rear camber having a convex profile beginning from said hub to approximately the midpoint thereof and for at least the last 15% of the blade, said rear camber profile being slightly concave beginning at approximately two-thirds of the distance from said hub, and being flat thereafter before assuming said convex profile.

* * * * *